(12) United States Patent
Ogura et al.

(10) Patent No.: US 6,387,477 B1
(45) Date of Patent: *May 14, 2002

(54) TRANSPARENT LAMINATE

(75) Inventors: Koji Ogura, Toyonaka; Yoshihide Amekawa, Niihama, both of (JP)

(73) Assignee: Sumitomo Chemical Company, Limited, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/256,991

(22) Filed: Feb. 25, 1999

(30) Foreign Application Priority Data

Feb. 25, 1998 (JP) .............................. 10-043628
Feb. 25, 1998 (JP) .............................. 10-043630

(51) Int. Cl.$^7$ ............................ B32B 5/02; B32B 27/08; B32B 27/30; B32B 27/38
(52) U.S. Cl. ................. 428/215; 428/327; 428/332; 428/412; 428/414; 428/520; 428/522
(58) Field of Search ................. 428/215, 327, 428/332, 412, 414, 520, 522

(56) References Cited

U.S. PATENT DOCUMENTS

| | | | |
|---|---|---|---|
| 4,125,669 A | 11/1978 | Triebel et al. | 428/412 |
| 4,198,468 A | 4/1980 | Molari | 428/412 |
| 4,322,476 A | 3/1982 | Molari, Jr. | 428/412 |
| 4,328,277 A | 5/1982 | Molari, Jr. | 428/215 |
| 5,773,139 A | 6/1998 | Ogura et al. | 428/332 |

FOREIGN PATENT DOCUMENTS

| | | |
|---|---|---|
| GB | 1498265 | 4/1974 |
| JP | 4301448 A | 10/1992 |
| JP | 4361034 A | 12/1992 |

*Primary Examiner*—Paul Thibodeau
*Assistant Examiner*—Ramsey Zacharia
(74) *Attorney, Agent, or Firm*—Birch, Stewart, Kolasch & Birch, LLP

(57) ABSTRACT

The present invention provides a transparent laminate comprising a laminate substrate obtained by bonding a Second substrate composed of a polycarbonate-based resin to a first surface of a first substrate composed of an acrylic resin via a first bonding layer composed of a resin having a glass transition temperature(Tg) of about 50° C. or less, and a surface layer composed of a polycarbonate-based resin bonded via a surface bonding layer composed of an acrylic resin to a second surface of the first substrate, which laminate is light and excellent in transparency and excellent in impact resistance when it repeatedly receives an impact.

8 Claims, 2 Drawing Sheets

TRANSPARENT LAMINATE

BACKGROUND OF THE INVENTION

1. Field of the Invention

The present invention relates to a transparent laminate excellent in impact resistance which is suitably used as for example a bulletproof face guard, bulletproof shield, a glazing member of various vehicles, a partition board on a bank counter, a crime preventive door and the like.

2. Description of the Related Art

A transparent plate having impact resistance is often used as a glazing member in public facilities, athletic facilities and the like, as a partition board on a bank counter and the like, as a glazing member of a crime-preventive door and the like, as a glazing member of various vehicles, as well as for other materials and applications.

As such a transparent plate, there are known silicate glass plates, polycarbonate-based resin plates, and further, a transparent laminate obtained by bonding a silicate glass plate to a polycarbonate-Dased resin plate via a methacrylate-based syrup (USP 4,125,669), transparent laminates obtained by bonding a plurality of polycarbonate-based resin plates via an adhesive layer composed of a thermoplastic polyurethane-based resin (GB 1498265, Japanese Patent Application Laid-Open(JP-A) Nos. 4-301448, 4-361034), and the like. However, in these transparent plates, there is a problem that for improving impact resistance, an increase in thickness is required, and consequently their weight increases, which often leads to a lack of practicability.

For solving such a problem, there have been suggested transparent plates obtained by bonding an acrylic resin plate to a polycarbonate-based resin plate via an adhesive layer (USP 5,773,139). By these means, it has become possible to secure impact resistance while at the same time maintaining light weight.

However, in the above-described prior technologies, when the plate receives an impact several times repeatedly, the impact resistance thereof is not satisfactory. Namely, though a protective ability against a strong impact can be manifested sufficiently, when the plate receives an impact several times, particularly when the plate receives an impact several times at the same position, small fragments are often scattered from parts around the impact position with such small fragments being deleted from the impact position of the transparent plate, to thereby cause the possibility of a decrease in visibility through the impact position. Such a deletion of small fragments is not preferable, with respect to the appearance of the product when the product is going to be used continuously.

In view of such background considerations, there has been desired the development of a transparent plate having a sufficiently improved impact resistance in the case of being impacted several times repeatedly, without sacrificing or losing properties such as light weight, transparency and the like.

SUMMARY OF THE INVENTION

An object of the present invention is to provide a transparent laminate which is light and excellent in transparency and which can manifest a sufficient protective ability against strong impact, and which is excellent in impact resistance when subjected to repeated impacts.

For attaining this object of the invention, the present inventors have intensively studied and found that impact resistance against repeated impacts can be improved while maintaining light weight and transparency, by the integrated bonding of (i) a surface layer composed of a polycarbonate-based resin via a surface bonding layer composed of an acrylic resin, to (ii) a first substrate of a laminated substrate structure, which laminate substrate structure is obtained by bonding the first substrate composed of an acrylic resin to a second substrate composed of a polycarbonate-based resin via a first bonding layer composed of a resin layer having a glass transition temperature(Tg) of about 50° C. or less, and that warping of the laminate comprising the surface layer, the surface bonding layer and the first substrate is decreased by further laminating a third substrate composed of a polycarbonate-based resin between the first substrate and the second substrate, by bonding the third substrate via a second bonding layer composed of a acrylic resin, with the third substrate also being bonded to the second substrate via the first bonding layer.

Namely, in a first embodiment of the invention, the transparent laminate of the present invention comprises a laminate substrate obtained by bonding a second substrate composed of a polycarbonate-based resin to a first substrate composed of an acrylic resin via a first bonding layer composed of a resin having a glass transition temperature (Tg) of about 50° C. or less, and a surface layer composed of a polycarbonate-based resin bonded via a surface bonding layer composed of an acrylic resin to an outter surface of the above-described first substrate. (See FIG. 1)

In a second embodiment of the above-described transparent laminate, a third substrate composed of a polycarbonate-based resin is laminated between the first substrate composed of an acrylic resin and the second substrate composed of a polycarbonate-based resin, such that the third substrate is bonded to the first substrate via a second bonding layer composed of an acrylic resin, and the third substrate is bonded to the second substrate via the first bonding layer respectively. (See FIG. 2)

DETAILED DESCRIPTION OF THE PREFERRED EMBODIMENTS

The following detailed description is provided as an aid to those desiring to practice the present invention. The following description is not to be constructed as being limiting to the instant invention, since those of ordinary skill in the art will realize that various modifications, changes and substitutions made be made in the various materials and methods disclosed herein, without departing from the spirit or scope of the present inventive discovery. Instead, the present invention is only limited by the scope of the claims appended hereto and the equivalents encompassed thereby.

A first embodiment of the transparent laminate of the present invention will be illustrated referring to drawings below.

Figure 1:
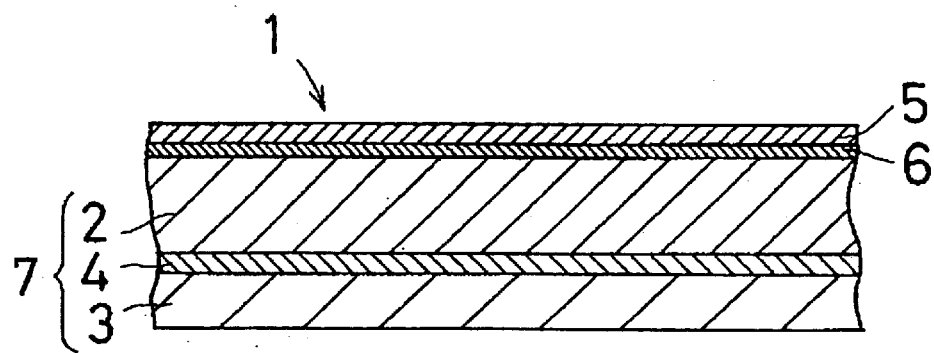
FIG. 1 is a schematic sectional view showing a transparent laminate of a first embodiment of the present invention.

The transparent laminate(1) of the present invention comprises (i) as an outer layer a second substrate(3) that is composed of a polycarbonate-based resin plate bonded to a first surface of a first substrate(2) that is composed of an acrylic resin plate via a first bonding layer(4) that is composed of a resin having a glass transition temperature(Tg) of about 50° C. or less, and further comprises (ii) as a second outter a surface layer(5) that is composed of a polycarbonate-based resin, which is bonded to a second surface of the above-described first substrate(2) via a surface bonding layer (6) that is composed of an acrylic resin, as shown in FIG. 1.

The acrylic resin constituting the first substrate(2) is not particularly restricted, and examples thereof include polymethyl methacrylate, methyl methacrylate, and copolymers of methyl methacrylate with other monomers copolymerizable with methyl methacrylate.

Examples of the other monomers copolymerizable with methyl methacrylate include alkyl methacrylates carrying an alkyl group having 2 to about 8 carbon atoms such as ethyl methacrylate, propyl methacrylate, butyl methacrylate, octyl methacrylate and the like, alkyl acrylates carrying an alkyl group having 1 to about 8 carbon atoms such as methyl acrylate, ethyl acrylate, propyl acrylate, butyl acrylate, octyl acrylate and the like, methacrylic acid, acrylic acid, methacrylamide, acrylamide, styrene, glycidyl methacrylate, glycidyl acrylate and the like, and mixtures thereof.

In such acrylic resins, a copolymer composed of about 90% by weight or more of methyl methacrylate and about 10% by weight of less of one or two monomers selected from glycidyl methacrylate and glycidyl acrylate is suitably used since it has excellent bonding strength with an elastomer having a glass transition temperature (Tg) of about 50° C. or less.

Such acrylic resins can be produced by known methods in which methyl methacrylate alone or methyl methacrylate and other monomers are together subjected to casting polymerization, emulsion polymerization, suspension polymerization and bulk polymerization.

Such acrylic resins may be crosslinked. When crosslinked, surface hardness and solvent resistance increase. For obtaining a crosslinked acrylic resin, a crosslinking agent may advantageously be added for polymerization in an amount of about 20 parts by weight based on 100 parts by weight of the total amount of the above-described methyl methacrylate and other monomers.

As the crosslinking agent, monomers containing a plurality of polymerizable unsaturated bonds in the molecule are used, and examples thereof include ethylene glycol di(meth) acrylate, tetraethylene glycol di(meth)acrylate, diethylene glycol di(meth)acrylate, trimethylolethane tri(meth)acrylate, trimethylolpropane tri(meth)acrylate, pentaerythritol tetra (meth)acrylate, allyl (meth)acrylate and the like.

The first substrate(2) is a layer composed of the above-described acrylic resin, and it is preferable that such acrylic resin contains a multi-layer elastomer particle for purposes of improving impact resistance and obtaining further excellent protective abilities.

As the multi-layer elastomer, there are listed the same multi-layer elastomer particles as usually used in an acrylic resin plate having impact resistance, for example, elastomer particles having 2-layer structures containing a crosslinked acrylate-based copolymer as an internal core layer and an acrylic (co)polymer as an external core layer, and elastomer particles having 2-layer structures containing a crosslinked methacrylate-based (co)polymer as an internal core layer, a crosslinked acrylate copolymer as an intermediate layer and an acrylic (co)polymer as an external core layer, and the like.

As the acrylic (co)polymer constituting the external core layer of the 2-layer elastomer particles and the external core layer of the 3-layer elastomer particles, there are listed for example (co)polymers containing about 60 to about 100% by weight of an alkyl methacrylate carrying an alkyl group having 1 to about 4 carbon atoms and about 40 to about 0% by weight of other monomers having a double bond.

Examples of the alkyl methacrylate carrying an alkyl group having 1 to about 4 carbon atoms include methyl methacrylate, ethyl methacrylate, propyl methacrylate, butyl methacrylate and mixtures thereof. Examples of the other monomer having a double bond include alkyl acrylates such as methyl acrylate, ethyl acrylate and the like, monomers copolymerizable with an alkyl methacrylate such as styrene, acrylonitrile, methacrylate, 2-hydroxy methacrylate and the like.

As the crosslinked acrylate-based copolymer constituting the internal core layer of the 2-layer elastomer particle and the intermediate layer of the 3-layer elastomer particle, there are for example listed crosslinked acrylate-based copolymers obtained by copolymerizing of a mixture of about 45 to about 99.5% by weight of an alkyl acrylate monomer carrying an alkyl group having 1 to about 8 carbon atoms, about 0 to about 40% by weight of an aromatic vinyl monomer, about 0 to about 10% by weight of a polyfunctional monomer and about 0.5 to about 5% by weight of a graft monomer.

Examples of the alkyl acrylate monomer carrying an alkyl group having 1 to about 8 carbon atoms include methyl acrylate, ethyl acrylate, propyl acrylate, butyl acrylate, octyl acrylate and the like. Examples of the aromatic vinyl monomer include α-methylstyrene, chlorostyrene, p-tert-butylstyrene and the like. Examples of the polyfunctional monomer include alkylene glycol diacrylates such as ethylene glycol diacrylate, 1,2-propylene glycol diacrylate, 1,3-propylene glycol diacrylate and the like, alkylene glycol dimethacrylates such as ethylene glycol dimethacrylate, triethylene glycol dimethacrylate and the like. Preferable examples of the graft monomer include allyl esters, methallyl esters and chrotyl esters of α, β-unsaturatedcarboxylic acids and dicarboxylic acids, and the like. Among others, allyl methacrylate, diallyl methacrylate and the like are preferable.

As the crosslinked methacrylate-based (co)polymer constituting the3-layer elastomer particles, there are for example listed crosslinked metacrylate-based (co) polymers obtained by copolymerization of a mixture of about 60 to about 99.8% by weight of an alkyl methacrylate carrying an alkyl group having 1 to about 4 carbon atoms, about 0 to about 40% by weight of other monomers having a double bond, about 0 to about 5% by weight of a polyfunctional monomer and about 0.2 to about 2% by weight of a graft monomer. As the alkyl methacrylate carrying an alkyl group having 1 to about 4 carbon atoms, other monomers having a double bond, polyfunctional monomers and graft monomers described herein, the same compounds are acceptable, as respectively for the internal core layer and the external core layer of the 2-layer elastomer particles.

Such multi-layer elastomer particles can be produced by a known method readily available to those skilled in the art.

The content of multi-layer elastomer particles contained in the first substrate(2) is preferably from about 0.1 to about 72 parts by weight, more preferably from about 5 to about 33 parts by weight, particularly preferably from about 8 to about 25 parts by weight per 100 parts by weight of an acrylic resin. A content less than about 0.1 part by weight is not preferable since then effect of improving impact resistance is poor, and the effect of using multi-layer elastomer particles is not obtained sufficiently. On the other hand, a content over about 72 parts by weight is not preferable since then impact resistance tends to rather decrease and the part thereof which receives an impact whitens.

For securing the transparency of the obtained first substrate(2), it is preferable that the refractive index of a multi-layer elastomer particle used is approximately the same as the refractive index of an acrylic resin constituting the first substrate(2).

For allowing the first substrate(2) to contain multi-layer elastomer particles, the multi-layer elastomer particles and the above-described acrylic resin may be melted and kneaded, or the multi-layer elastomer particles may be previously added together with additives described below in preparing the acrylic resin.

The first substrate(2) composed of an acrylic resin containing the thus obtained multi-layer elastomer particles can be produced by known methods(for example, those described in Japanese Patent Application Publication (JP-B) No. 55-27,576, Japanese Patent Application Laid-Open (JP-A) No. 8-151,498), and may be a commercially available product. As such commercially available products, there are listed for example Sumipex® GT (manufactured by Sumitomo Chemical Co., Ltd.), Sumipex® IT (manufactured by Sumitomo Chemical Co., Ltd.) and the like.

The acrylic resin may further contain an additive. As the additive, there are for example listed ultraviolet ray absorbers, antioxidants, plasticizers, coloring agents and the like.

As the ultraviolet ray absorber, there are for example listed ultraviolet ray absorbers composed of benzotriazole-based compounds such as Tinuvin® P (manufactured by Ciba-Geigy), Sumisorb® 340 (manufactured by Sumitomo Chemical Co., Ltd.) and the like, benzophenone-based compounds such as Ceasorb® 101S (manufactured by Cypro Kasei K.K.), Sumisorb® 110 (manufactured by Sumitomo Chemical Co., Ltd.) and the like, hindered amine-based compounds such as Tinuvin® 770 (manufactured by Ciba-Geigy), Sanol® LS2626 (manufactured by Sankyo Co., Ltd.), and the like.

When a ultraviolet ray absorber is added, the amount added thereof is usually about 1 part by weight or less, preferably from about 0.01 to about 0.2 parts by weight per 100 parts by weight of an acrylic resin.

As the antioxidant, there are for example listed phenol-based compounds such as Sumilizer® BO101 (manufactured by Sumitomo Chemical Co., Ltd.), Sumilizer® GM (manufactured by Sumitomo Chemical Co., Ltd.) and the like, phosphorus-based compounds such as Mark® PEP-8 (manufactured by Adeka K.K.), Mark® PEP-24 (manufactured by Adeka K.K.) and the like.

As the plasticizer, there are for example listed aromatic carboxylic acids such as dibutyl phthalate, dioctyl phthalate and the like, aliphatic polybasic acid esters such as dioctyl adipate, acetyltributyl citrate and the like.

As the coloring agent, there are for example listed anthraquinone-based dyes such as Sumiplast® Green G (manufactured by Sumitomo Chemical Co., Ltd. Sumiplast® Blue OR (manufactured by Sumitomo Chemical Co., Ltd.) and the like, perynone-based dyes such as Sumiplast® Orange HRP (manufactured by Sumitomo Chemical Co., Ltd.) and the like.

The thickness of the first substrate(2) is preferably from about 3 to about 30 mm. A thickness less than about 3 mm is not preferable since then excellent impact resistance cannot be secured, on the other hand, a thickness over about 30 mm is not preferable since then the weight is too high and a light weight can not be attained, and also the cost increases. In this preferred range, the thickness is more preferably from about 5 to about 15 mm, and particularly preferably from about 8 to about 13 mm.

On the other hand, as the polycarbonate-based resin constituting the second substrate(3), for example, a polymer thermoplastic polycarbonate and the like are listed, and among others, resins composed of a dihydroxydiarylalkane are suitably used since they are excellent in impact resistance.

The thickness of the second substrate (3) is preferably from about 3 to about 15 mm. A thickness less than about 3 mm is not preferable since then excellent impact resistance can not be secured, on the other hand, a thickness over about 15 mm is not preferable since then the weight is too high and a light weight can not be attained, and also the cost increases. In this preferred range, the thickness is more preferably from about 3 to about 8 mm.

Then, as the resin constituting the first bonding layer (4), namely as the resin bonding the first substrate (2) to the second substrate(3) (See FIG. 1), polyvinylbutyral, epoxy-based resins, urethane-based resins, silicon-based resins and acrylic resins are listed, and among them, resins having a glass transition temperature(Tg) of about 50° C. or less are used.

Epoxy-based resins and acrylic resins are preferably used, and among them, epoxy-based resins, particularly bisphenol type epoxy resins are preferably used since the obtained laminate has excellent impact resistance and transparency and manifests excellent adhesion with the substrates to be bonded therewith.

The bisphenol type epoxy resins will be described in detail below.

The bisphenol type epoxy resin is a resin obtained by curing of a bisphenol epoxy resin, and can be obtained for example by reacting a bisphenol type epoxy resin with a curing agent.

The bisphenol type epoxy resin is a bisphenol type epoxy resin having two or more epoxy groups, and specifically, there are for example listed commonly used epoxy resins such as a bisphenol A type epoxy resin, bisphenol F type epoxy resin, polyphenol type epoxy resin, silicon-modified type epoxy resin and the like, epoxy resins obtained by reaction of epichlorohydrin with polyethylene glycol, epoxy resins obtained by reacting α ω glycol and the like with a blocked copolymer of ethylene oxide with propylene oxide, and the like, and mixtures of the above-described epoxy resins. Among them, a mixture containing about 5 to about 30 parts by weight of a bisphenol A type epoxy resin per 100 parts by weight of a bisphenol F type epoxy resin is desirably used, and by this constitution, a transparent laminate(1) can be obtained which exhibits excellent transparency and has a first bonding layer(4) having excellent flexibility. Further, a mixture containing about 10 to about 25 parts by weight of a bisphenol A type epoxy resin per 100 parts by weight of a bisphenol F type epoxy resin is even more preferably used.

As the curing agent, aliphatic hydrocarbon-based compounds having two or more amino groups are for example used, and specifically, there are listed aliphatic diamines such as polymethylenediamine, polyetherdiamine and the like, aliphatic polyamines such as diethylenetriamine, triethylenetetramine, 1,2-substituted diamine, substituted polyamine, dimethyllaminopropylamine, aminoethylethanolamine, methyliminopropylamine and the like, aliphatic polyamines such as methanediamine, 1,3-diaminocyclohexane and the like. Among others, a polyether diamine is preferably used since then a transparent laminate (1) is obtained which exhibits little coloration and has a first bonding layer(4) that is excellent in flexibility. The amount used of such curing agent is usually from about 25 to about 140 parts by weight, preferably from about 80 to about 120 parts by weight per 100 parts by weight of a bisphenol type epoxy resin.

Such first bonding layer(4) can be formed by a method in which a mixture of a bisphenol type epoxy resin and a curing agent is cured.

When curing is conducted, for example, it may be recommendable that a bisphenol type epoxy resin is mixed with a curing agent before the mixture is heated. The heating temperature is usually from about 20 to about 150° C., preferably from about 20 to about 80° C. Even if the heating temperature is lower than about 20° C., curing is possible, however, such temperature range is not preferable since then there is a tendency that the resin is not easily cured sufficiently.

In conducting curing, a reactive diluting agent and a non-reactive diluting agent may be mixed.

As the reactive diluting agent, there are for example listed monoepoxy compounds such as styrene oxide, octylene oxide and the like, polyepoxy compounds such as diglycidyl ether, butanediol glycidyl ether and the like, and mixtures thereof, and the amount used thereof is usually about 80 parts by weight or less per 100 parts by weight of a bisphenol type epoxy resin.

As the non-reactive diluting agent, there are for example listed solvents such as xylene, glycol and the like and plasticizers such as phthalates and the like, and the amount used thereof is usually about 80 parts by weight or less per 100 parts by weight of a bisphenol type epoxy resin. Use of such a non-reactive diluting agent is preferable since then a transparent laminate(1) having a first bonding layer(4) prosessing more excellent flexibility is obtained.

As the acrylic resin constituting the first bonding layer(4), there are listed resins obtained by polymerization of a mixture composed about 77 to about 98.9% by weight of an acrylic monomer or partial polymer thereof, about 1 to about 20% by weight of a plasticizer and about 50.1 to about 3.0% by weight of a polyfunctional monomer.

The acrylic monomer comprises about 50 to about 100% by weight of an alkyl methacrylate carrying an alkyl group having about 5 to about 8 carbon atoms, about 0 to about 10% by weight of an alkyl acrylate carrying an alkyl group having 1 to about 8 carbon atoms and about 0 to about 40% by weight of an alkyl methacrylate carrying an alkyl group having 1 to about 4 carbon atoms, and as the alkyl methacrylate carrying an alkyl group having about 5 to about 8 carbon atoms, there are listed amyl methacrylate, hexyl methacrylate, octyl methacrylate, 2-ethylhexyl methacrylate and the like, as the alkyl acrylate carrying an alkyl group having 1 to about 8 carbon atoms, there are listed methyl acrylate, ethyl acrylate, propyl acrylate, butyl acrylate, octyl acrylate and the like, and as the alkyl methacrylate carrying an alkyl group having 1 to about 4 carbon atoms, there are listed methyl methacrylate, ethyl methacrylate and the like.

As the plasticizer, known external plasticizers for an acrylic resin such as phthalic acid, adipic acid, sebacic acid, dimethyl phthalate, dioctyl phthalate, dioctyl adipate, dioctyl sebacate, acetyltributyl citrate and the like are used.

As the polyfunctional monomer, there are listed divinylbenzene, ethylene glycol dimethacrylate, butylene glycol dimethacrylate, trimethylolpropane triacrylate, pentaerythritol tetraacrylate and the like.

The first bonding layer(4) can be formed by a method in which a suitable polymerization initiator is added to a mixture composed of an acrylic monomer or partial polymer thereof, a plasticizer and a polyfunctional monomer, and the mixture is polymerized to be cured.

Such first bonding layer(4) may contain various additives such as an ultraviolet ray absorber, an antioxidant, a coloring agent and the like.

As the ultraviolet ray absorber, the same benzotriazole-based compounds, benzophenone-based compounds, hindered amine-based compounds and the like as listed above are for example listed.

As the antioxidant, there are for example listed the same phenol-based compounds, phosphorus-based compounds and the like as listed above, and further, inorganic phosphates such as disodiumhydrogenphosphite pentahydrate, sodium phosphite and the like.

As the coloring agent, there are for example listed the same anthraquinone-based dyes, perynone-based dyes and the like, and further, fluorescent brighteners such as fluorescein, thioflavin, eosin, rhodamine, cumarine, imidazole, oxazole, triazole, carbazole, pyridine, naphthalic acid, imidazolone, diaminostilbenesulfonic acid and the derivatives thereof and the like.

The glass transition temperature(Tg) of such first bonding layer(4) is about 5° C. or less, from about −50 to about 50° C., preferably from about −30 to about 40° C., more preferably from about −20 to about 30° C. The glass transition temperature(Tg) can be measured by a differential scanning calorimetry method (SDC method) and the like.

A resin having a glass transition temperature(Tg) out of the range of about −50 to about 50° C. is not preferable since such resin is poor in impact resistance. The resin to be used is appropriately selected from resins having a glass transition temperature (Tg) within the range of about −50 to about 50° C. depending on temperature condition under which the transparent laminate of the present invention is used.

100% modulus (value measured according to JIS K 6251) of the first bonding layer(4) is preferably from about 5 to about 150 kgf/cm$^2$.

Further, the thickness of the first bonding layer(4) is preferably from about 0.1 to about 4 mm. A thickness less than about 0.1 mm is not preferable since then sufficient bonding strength can not be secured, on the other hand, a thickness over about 4 mm is not preferable since then sufficient impact resistance is not obtained and cost increases. Among these preferred thickness, a thickness of about 1 to about 3 mm is more preferable.

Then, the polycarbonate-based resin constituting the surface layer(5) is not particularly restricted, however, polymer thermoplastic polycarbonates and the like are for example listed, and among them, those comprising a dihydroxydiarylalkane are suitably used due to their excellent impact resistance.

The thickness of the surface layer(5) is preferably from about 0.1 to about 3 mm. A thickness less than about 0.1 mm is not preferable since impact resistance when the layer repeatedly receives impacts can not be secured sufficiently. On the other hand, a thickness over about 3 mm is not preferable since the weight is too high and light weight can not be sufficiently attained and also the cost increases. In this range, the thickness is preferably from about 0.3 to about 3 mm, and particularly preferably from about 0.5 to about 2 mm.

The surface bonding layer(6) is a layer which has function to firmly adhere a surface of the first substrate(2) to a surface of the surface layer(5) and contributes to improvement of impact resistance when an impact is repeatedly received several times. As the acrylic resin constituting the surface bonding layer(6), there can be for example exemplified the same resins as listed for the acrylic resin constituting the first substrate (2), and preferably, resins having a vicat softening point from about 50 to about 90° C. and having a haze, when the thickness is 50 μm, of about 1 to about 60%, preferably about 1 to about 10%, more preferably about 2 to about 5% are used. The haze can be measured according to JIS K 6718.

A resin having a vicat softening point out of the range from about 50 to about 90° C. is not easily bonded. For easy deaeration in bonding, the resin layer surface may advantageously have a fine degree of unevenness, and this unevenness corresponds to a haze of about 1 to about 60% when the thickness is 50 μm. When the haze is less than about 1%, deaeration is insufficient, and when the haze is over about 60%, the transparency of a transparent laminate decreases.

As commercially available products of such acrylic resins, for example, Sunduren® 002ANTB manufactured by Kaneka Corp. and the like are preferably used.

The thickness of the surface bonding layer(6) is from about 10 to about 1000 μm, preferably from about 20 to about 200 μm. A thickness less than about 10 μm is not preferable since then impact resistance when the layer receives impact several times repeatedly can not be sufficiently secured, and also bonding strength between the first substrate(2) and the surface layer(5) decreases. On the other hand, a thickness over about 1000 μm is also not preferable since then effect corresponding to or over increase in thickness is not obtained and only cost increases for nothing.

For producing the transparent laminate of the present invention, for example, a surface layer(5) composed of a polycarbonate-based resin may be bonded via a surface bonding layer(6) composed of an acrylic resin to a first surface of a first substrate(2) composed of an acrylic resin, then, a second substrate(3) composed of a polycarbonate-based resin may be bonded via a first bonding layer(4) composed of a resin having a glass transition temperature (Tg) of about 50° C. or less to a second surface of the first substrate(2); or a second substrate(3) composed of a polycarbonate-based resin may be bonded via a first bonding layer(4) composed of a resin having a glass transition temperature(Tg) of about 50° C. or less to a first surface of a first substrate(2) composed of an acrylic resin, then, a surface layer(5) composed of a polycarbonate-based resin may be bonded via a surface bonding layer(6) composed of an acrylic resin to a second surface of the first substrate(2). Of course, these constituent materials may all be laminated at the same time and the order of the lamination is not restricted in the instant invention.

The first substrate(2) composed of an acrylic resin can be produced by methods such as an extrusion molding method, a casting molding method and the like.

For bonding a surface layer(5) composed of a polycarbonate-based resin via a surface bonding layer(6) composed of an acrylic resin to a surface of the first substrate(2) of such a laminate substrate(7), for example, there are listed a method in which the surface bonding layer(6) and the surface layer(5) are laminated in this order on one surface of the first substrate(2) and the obtained laminate is thermally pressured, a method in which this obtained laminate is adhered in vacuum, and the like.

For conducting the thermal pressing, for example, it is recommendable that the first substrate(2), the surface bonding layer(6) and the surface layer(5) are laminated in this order between a pair of molds which have been heated and the obtained laminate is pressed. The heating temperature of the molds is usually from about 120 to about 200° C., preferably from about 140 to about 180° C., and the pressing pressure is usually from about 5 to about 80 kgf/cm², preferably from about 30 to about 50 kgf/cm². Heating temperatures less than about 120° C. and the pressing pressures less than about 5 kgf/cm²are not preferable since then bubble may be formed between the first substrate(2) and the surface bonding layer(6) and between the surface bonding layer(6) and the surface layer(5), and the bonding strength may be insufficient. Further, heating temperatures over about 200° C. and pressing pressures over about 80 kgf/cm are not preferable, since then the surface layer(5) and the first substrate(2) flow or are deformed during the pressing.

For conducting the vacuum adhesion, for example, it is recommendable that the surface bonding layer(6) held between a first substrate(2)and the surface layer(5) is inserted in a vacuum bag used for vacuum adhesion of a laminated glass, and pressure in the vacuum bag is reduced and they are heated at a temperature from about 100 to about 180° C. to thereby be laminated. Then, by heating again, the surface layer(5) can be bonded via the surface bonding layer(6) to one surface of the first substrate(2). The heating temperature in this second heating is usually from about 100 to about 200° C., preferably from about 130 to about 170° C. This second heating is preferably conducted under a pressure of 1 atm. or more, and when pressuring, the pressure is usually about 15 atom or less, preferably from about 6 to about 12 atm.

When a second substrate(3) composed of a polycarbonate-based resin is bonded via a first bonding layer composed of a resin having a glass transition temperature (Tg) of about 5° C. or less to one surface of a first substrate(2) , it is recommendable, for example, that the first substrate(2) and the second substrate(3) are plated apart so that they face each other, and into this aperture are injected a bisphenol type epoxy-based resin and a curing agent as a resin having a glass transition temperature(Tg) of about 50° C. or less and this resin is cured to form the first bonding layer(4). A reactive diluting agent, non-reactive diluting agent and the like, and various additives can be injected together with the bisphenol type epoxy-based resin.

In injecting, the first substrate(2) and the second substrate (3) may be place apart via a spacer. The thickness of the spacer is determined according to the thickness of the intended first bonding layer(4).

For curing after injection, the laminate may also be left as it is at room temperature, however, polymerization requires longer period of time and polymerization tends to be incomplete at room temperature. Therefore, the laminate may advantageously be heated, and usually the temperature of the laminate is gradually increased. The heating is effected up to about 150° C., preferably up to about 80° C. The heating time is usually from about 10 to about 50 hours. When the heating temperature is over about 150° C., the first substrate(2) and the second substrate(3) may flow and may be deformed.

The transparent laminate(1) of the present invention may be a flat plate if desired, however, it may also contain a curved surface if so desired. For obtaining such a transparent laminate(1) containing a curved surface, plates previously having intended curved surface may advantageously be used as the first substrate(2), second substrate(3) and the surface layer(5), respectively. In this case, the bonding of the surface layer(5) to one surface of the first substrate(2) via the surface bonding layer(6) is preferably conducted by vacuum adhesion method.

Fogging preventing treatments, light resistant treatments, surface curing treatments and the like may be performed on one surface or both surfaces of the transparent laminate(1) of the present invention.

When a surface layer(5) composed of a polycarbonate-based resin is bonded to a first substrate(2) composed of an acrylic resin via a surface bonding layer(6) composed of an acrylic resin and then the first substrate(2) is bonded to a second substrate(3) composed of a polycarbonate-based resin via a first bonding layer composed of a resin having a glass transition temperature(Tg) of about 50° C. or less to produce a large size transparent laminate, warping occurs in a large size laminate made of the surface layer(5) composed of a polycarbonate-based resin and the first substrate(2) composed of an acrylic resin via the surface bonding layer composed of a acrylic resin, and therefore, injected liquid may leak from the sealing portion between the first substrate (2) and the second substrate(3), and consequently bonding therebetween may become insufficient. In production of a laminate of 2000 mm×1000 mm, for example, when warping of the obtained laminate is over about 10 mm (convex part around center is placed on a flat plate and distances between the four corners and the plane are measured), leaking of the injected liquid increases, and injection work becomes difficult.

The laminate comprising the surface layer(5), the surface bonding layer(6) and the first substrate(2) can be used by correcting the warp by thermal processing, and a laminate having little warp can be easily obtained by laminating a third substrate composed of a polycarbonate-based resin described below.

Figure 2:
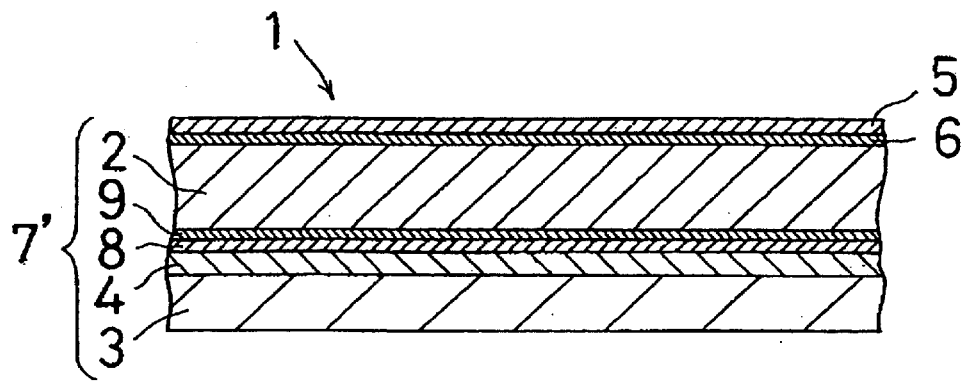
FIG. 2 is a schematic sectional view showing a transparent laminate of a second embodiment of the present invention.

A transparent laminate of the present invention using a third substrate is shown in FIG. 2.

In the laminate 7', the third substrate(8) composed of a polycarbonate-based resin is bonded via a second bonding layer(9) composed of an acrylic resin to a first surface of a first substrate(2) composed of an acrylic resin, and further, a second substrate(3) composed of a polycarbonate-based resin is bonded via a first bonding layer(4) composed of a resin having a glass transition temperature(Tg) of about 50° C. or less to a second surface of the above-described third substrate(8), and at the same time, a surface layer (5) composed of a polycarbonate-based resin is bonded via a surface bonding layer(6) composed of an acrylic resin to the laminate 7' at a second surface of the above-described first substrate(2).

As the polycarbonate-based resin constituting the third substrate(8), there are for example listed polymer thermoplastic polycarbonates and the like as described above, and among them, those comprising dihydroxydiarylalkane are suitably used since they are excellent particularly in impact resistance. The thickness of the third substrate(8) is preferably from about 0.1 to about 3 mm. A thickness less than about 0.1 mm is not preferable since then warping cannot be suppressed, on the other hand, a thickness over about 3 mm is not preferable since then the weight is too high and light weight is not sufficiently attained and further the cost also increases. In this preferred range, the thickness is more preferably from about 0.5 to about 2 mm.

The acrylic resin constituting the second bonding layer(9) is not particularly restricted and there can be exemplified the same resins as for the surface bonding layer (6).

For producing this transparent laminate, first, a surface layer(5) composed of a polycarbonate-based resin is bonded via a surface bonding layer composed of an acrylic resin to a first surface of a second substrate(2) composed of an acrylic resin, and at the same time, a third substrate(8) composed of a polycarbonate-based resin is bonded via a second bonding layer(9) composed of an acrylic resin film to a first surface of the first substrate(2), to obtain a laminate.

There are listed a method in which a surface layer(5) composed of a polycarbonate-based, a surface bonding layer(6) composed of an acrylic resin, a first substrate(2) composed of an acrylic resin, a second bonding layer(9) composed of an acrylic resin and a third substrate(8) composed of a polycarbonate-based resin are laminated in this order and then the obtained laminate is thermally pressed in the same manner as described above, a method in which this obtained laminate is adhered in vacuum in the same manner as described above, and the like.

In this laminate, warping can be decreased by lamination of the third substrate even if the laminate is large. Therefore, a second substrate(3) composed of a polycarbonate-based resin is bonded via a first bonding layer(4) composed of a resin having a glass transition temperature(Tg) of about 50° C. or less to an exposed surface of the third substrate(8) of the laminate without correcting warping, to produce a transparent laminate of the present invention.

Since the laminate substrate comprises a first substrate(2) composed of an acrylic resin having a first surface thereof bonded to a second substrate(3) composed of a polycarbonate-based resin via a first bonding layer(4) composed of a resin having a glass transition temperature(Tg) of about 50° C. or less, the transparent laminate is light and excellent in transparency, and manifests sufficient protective ability against strong impact. Also, since a surface layer(5) composed of a polycarbonate-based resin is bonded via a surface bonding layer(6) composed of an acrylic resin to a second surface of a first substrate composed of an acrylic resin, the transparent laminate is excellent in impact resistance when it repeatedly receives strong impacts, with sufficiently securing light weight and transparency thereof.

In the present invention, the first substrate(2) preferably contains a multi-layer elastomer particle in an mount of about 0.1 to about 72 parts by weight based on 100 parts by weight of an acrylic resin, and in this case, impact resistance is further improved and further excellent protective ability against strong impact can be manifested.

The thickness of the surface layer(5) composed of a polycarbonate-based resin is desirably from about 0.1 to about 3 mm, and by this dimension, sufficient light weight is maintained and at the same time excellent impact resistance against repeated impact is secured.

It is desirable that the thickness of the above-described surface bonding layer(6) composed of an acrylic resin is from about 10 to about 1000 $\mu$m, preferably from about 20 to about 200 $\mu$m for maintaining low cost, securing adhesion strength sufficiently, and securing excellent impact resistance against repeated impact.

Further, it is desirable that the thickness of the first substrate(2) is from about 3 to about 30 mm and the thickness of the second substrate(3) is from about 3 to about 15 mm, and by this dimension, sufficient light weight is maintained, and at the same time, more excellent impact resistance, namely more excellent protective ability is secured.

The thickness of the third substrate(8) is from about 0.1 to about 3 mm, and lamination of this third substrate can decrease warping even of a large scale laminate. Therefore, the second substrate(3) composed of a polycarbonate-based resin can be bonded via a first bonding layer(4) composed of a resin having a glass transition temperature (Tg) of about 50° C. or less to an exposed surface of the third substrate of the laminate as it is, without correcting warping.

Each of the publications and patented documents referred to herein are incorporated by reference in their entirety.

EXAMPLE

The following specific examples further illustrate the present invention.

Evaluation of the obtained transparent laminates was conducted as follows.

Transparency Before Impact

It was evaluated visually based on the following criteria.
Transparency Criteria
○: Opposite side can be easily observed through a transparent laminate.
Δ: Opposite side can not be easily observed through a transparent laminate.
X: Opposite side can not be observed through a transparent laminate.

Impact Resistance

Impact Test Method

Figure 3:
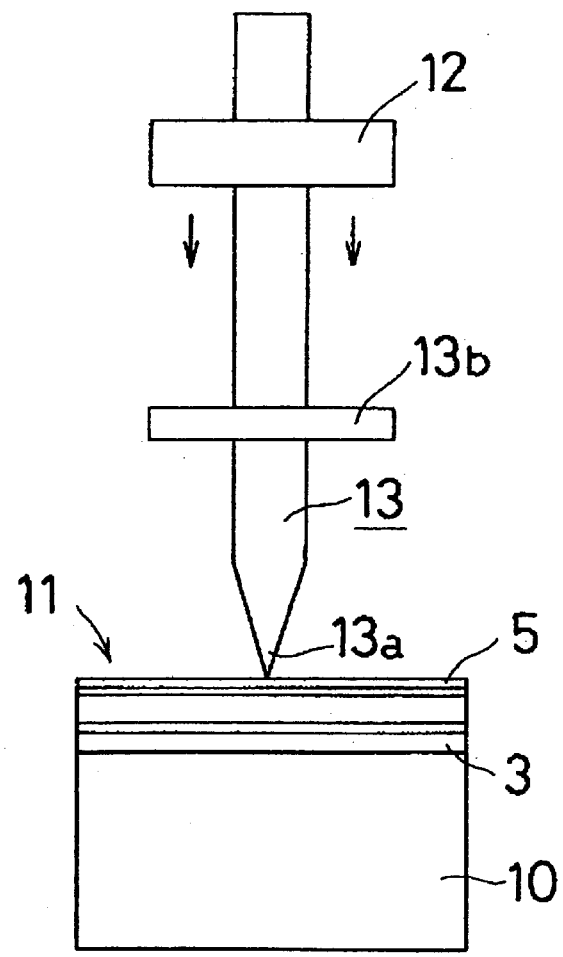
FIG. 3 is a schematic view of an impact tester.
Figure 4:
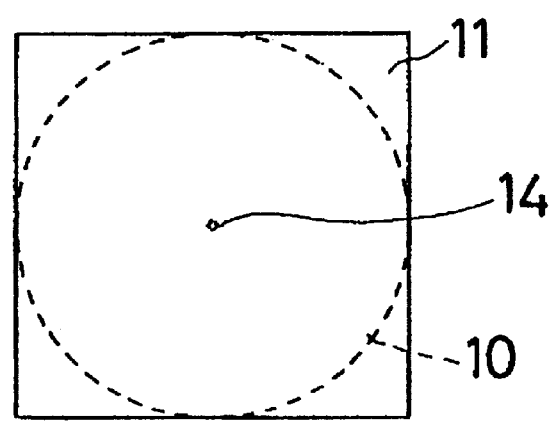
FIG. 4 is an explanation view showing positional relation between a sample, a supporting table and a striking member.

On a sample supporting table (cylindrical, made of iron, diameter: 100 mm)(10) of an impact tester (FIG. 3), a transparent laminate cut of 100 mm×100 mm as a sample (11) was plated with the surface layer (5) facing upward, and on this, leading end (13a) of a striking member having conical leading end (having an end diameter of 2 mm) (13) was pushed. At the center of longitudinal direction of this striking member (13), a weight supporting disc (13b) is projected. A stainless weight (30 kg) (12) was allowed to fall from position of 2.5 m height (height from the supporting disc) toward this supporting disc (13b) by free fall. In this operation, the sample (11) was placed so that four edges thereof meet periphery of the sample supporting table (10), and the leading end (13a) of the striking member was pushed to the center of the sample (11) so that impact position (14) was at the center of the sample (11) (FIG. 4).

The falling of this weight (12) was conducted twice at the same position, and scattering of the sample (11) (scattering of fragments) in each impact and extent thereof were visually observed and evaluated according to the following criteria.

Impact Test Criteria

○: no scattering of fragments
Δ: slight scattering of fragments
X: significant scattering of fragments

Visibility

Visibility of the opposite side through a transparent laminate at impact position was visually judged according to the following criteria.
Visibility Judging Criteria
○: No whitening occur and visibility is excellent.
Δ: Slight whitening occurs, however, visibility scarcely decreases.
X: Whitening occurs and visibility decreases.

Material Used

Acrylic Resin Plate A

To 100 parts by weight of a methyl methacrylate monomer was added 20 parts by weight of a powder of a methyl methacrylate-based resin (98% by weight of a methyl methacrylate unit, and 2% by weight of a methyl acrylate unit) obtained by a suspension polymerization method with stirring, and they were stirred for 2 hours at 60° C. to dissolve the methyl methacrylate-based resin. Then, 15 parts by weight of a 3-layer structure multi-layer elastomer (multi-layer elastomer containing 25.2% by weight of an elastomer obtained by a method described in Example 3 of Japanese Patent Application Publication (JP-B) No. 55-27576) was added with stirring, they were stirred for 1 hour, then, cooled to room temperature to obtain syrup in which the multi-layer elastomer was uniformly dispersed. 0.15 parts by weight of 2,2'-azobisisobutyronitrile was added to and dissolved into 100 parts by weight of this syrup and deaeration was effected, then, this solution was injected into a cell (area: 300 mm×300 mm) which had been constituted from two glass plates and a vinyl chloride gasket so that clearance between the glass plates was 10 mm, and polymerization was conducted for 4 hours in hot water bath at 65° C. Further, heat treatment was conducted for 2 hours in a hot air drying furnace at 120° C., the product was cooled to around room temperature, then, the glass plates were removed to obtain an acrylic resin plate (thickness: 10 mm, 300 mm×300 mm) containing the multi-layer elastomer. This was called acrylic resin plate A (first base plate).

Acrylic Resin Film B

"Sunduren® 002ANTB" (thickness: 100 μm, manufactured by Kaneka Corp.)

Acrylic Resin Film C

"Sumipex®" (polymethyl methacrylate plate, thickness: 10 mm, 300 mm×300 mm, manufactured by Sumitomo Chemical Co., Ltd., containing no multi-layer elastomer)

(Polycarbonate-based resin plate A)

"Polyca-Ace® ECK100" (thickness: 6 mm, 300×300 mm, manufactured by Tsutsunaka Plastic Industry Co., Ltd.)

Polycarbonate-based Resin Plate B

"Polyca-Aceg EC100" (thickness: 0.5 mm, 300 mm×300 mm, manufactured by Tsutsunaka Plastic Industry Co., Ltd.)

Example 1

The polycarbonate-based resin plate B was placed facing one surface of the acrylic resin plate A at a certain distance, the acrylic resin film B ("Sunduren® 002ANTB") was inserted between them, and they were pressed for 1 minute by a press molding machine at a heat plate temperature of 150° C., a preheating time of 2 minutes and pressing pressure of 50 kgf/cm²₁ then, pressed for 4 minutes in a cooling press at a pressing pressure of 50 kgf/cm², to bond the polycarbonate-based resin plate B (surface layer(5)) via the acrylic resin B (surface bonding layer(6)) to the acrylic resin plate A (first substrate(2)).

Then, the polycarbonate-based resin plate A (second substrate(3)) was placed facing the other surface of the acrylic resin plate A (first substrate(2)) at an distance of 2 mm. The distance was provided by inserting a soft vinyl chloride hose having a thickness of 2 mm between the acrylic resin plate A (first substrate(2)) and the polycarbonate-based resin plate A (second substrate(3)). Into this clearance was injected a mixture of 50 parts by weight of a curing agent (polyether amine-based curing agent, polyoxypropylenediamine, "HARDENER XNH3351", manufactured by Nagase & Company Ltd.) with a mixture ("EPOXY RESIN XNR3351", manufactured by Nagase &

Company Ltd.) of 42.5 parts by weight of a bisphenol F type epoxy resin and 7.5 parts by weight of a bisphenol A type epoxy resin, and the mixture was heated from 20° C. to 80° C. over 10 hours to be polymerized, to obtain a transparent laminate in which the polycarbonate-based resin plate A (second substrate(3)) was bonded via the bisphenol type epoxy-based cured resin layer(first bonding layer(4)) to the other surface of the acrylic resin plate A (first substrate(2)). The obtained bisphenol type epoxy-based cured resin layer had a 100% modulus of 39.4 kgf/cm$^2_1$ and a Tg of 10° C. (DSC method).

The results of the evaluation of the obtained transparent laminate are shown in Table 1.

Example 2

The polycarbonate-based resin plate B (surface layer(5)) was placed facing one surface of the acrylic resin plate A (first substrate(2)) at a certain distance, the acrylic resin film B ("Sunduren® 002ANTB") was inserted between them, this sandwich was placed in a vacuum bag, air in the vacuum bag was exhausted at an atmosphere temperature of 135°πC. to adhere them temporarily. Then, the sandwich was place in the autoclave, heated from room temperature at atmospheric pressure to 150° C. at 9 atm. over 60 minutes and the temperature and the pressure were kept for 30 minutes, then, cooled down to room temperature at atmospheric pressure over 50 minutes, to bond the polycarbonate-based resin plate B (surface layer(5)) via the acrylic resin B (surface bonding layer(6)) to the acrylic resin plate A (first substrate(2)).

Then, the polycarbonate-based resin plate A (second substrate(3)) was bonded via the bisphenol type epoxy-based cured resin layer(first bonding layer(4)) to the other surface of the acrylic resin plate(first substrate(2)) to obtain a transparent laminate in the same manner as in Example 1. The obtained bisphenol type epoxy-based cured resin layer had a 100% modulus of 39.4 kgf/cm$^2$, and a Tg of 10° C. (DSC method).

The results of the evaluation of the obtained transparent laminate are shown in Table 1.

Example 3

A transparent laminate was obtained in the same manner as in Example 1 except that the acrylic resin plate C was used instead of the acrylic resin plate A as the first substrate (2). This plate had excellent transparency, and when it received impact several times at the same position, the impact position revealed almost no whitening.

The results of the evaluation of the obtained transparent laminate are shown in Table 1.

Example 4

The polycarbonate-based resin plate B (third substrate(8)) was placed facing one surface of the acrylic resin plate A (first substrate(2)) at a certain distance, the acrylic resin film B (second bonding layer(9)) was inserted between them, and at the same time, the polycarbonate-based resin plate B (surface layer(5)) was placed facing the other surface of the acrylic resin plate A (first substrate(2)) at a certain distance in a like manner, the acrylic resin film B (surface bonding layer(6)) was inserted between them, and they were pressed for 1 minute by a press molding machine at a heat plate temperature of 150° C., a preheating time of 2 minutes and pressing pressure of 50 kgf/cm$^2$, then, pressed for 4 minutes in a cooling press at a pressing pressure of 50 kgf/cm$^2$, to obtain a laminate.

Then, the polycarbonate-based resin plate A (second substrate(3)) was placed facing the other surface(non-bonded surface) of the third substrate(8) of the above-described laminate at a distance of 2 mm. The distance was provided by inserting a soft vinyl chloride hose having a thickness of 2 mm between the polycarbonate-based resin plate B (third layer(8)) and the polycarbonate-based resin plate A (second substrate(3)). Into this clearance was injected a mixture of 50 parts by weight of a curing agent (polyether amine-based curing agent, polyoxypropylenediamine, "HARDENER XNH3351", manufactured by Nagase & Company Ltd.) with a mixture ("EPOXY RESIN XNR3351", manufactured by Nagase & Company Ltd.) of 42.5 parts by weight of a bisphenol F type epoxy resin and 7.5 parts by weight of a bisphenol A type epoxy resin, and the mixture was heated from 20° C. to 80° C. over 10 hours to be polymerized, to obtain a transparent laminate in which the polycarbonate-based resin plate A (second substrate(8)) was bonded via the bisphenol type epoxy-based cured resin layer(first bonding layer(4)) to the non-bonded surface of the third substrate(8) of the above-described laminate. The obtained first bonding(4) layer had a 100% modulus of 39.4 kgf/cm$^2$, and a Tg of 10° C. (DSC method).

Example 5

A transparent laminate was obtained in the same manner as in Example 4 except that the acrylic resin plate C was used instead of the acrylic resin plate A as the first substrate (2). This plate had excellent transparency, and when it received impact several times at the same position, the impact position revealed almost no whitening.

Comparative Example 1

A transparent laminate was obtained in the same manner as in Example 2 except that a film (thickness: 250 μm) of an ethylene-vinyl acetate copolymer was used instead of the acrylic resin film B (Sunduren® 002ANTB)as the surface bonding layer(6).

The results of the evaluation of the obtained transparent laminate are shown in Table 1.

Comparative Example 2

An adhesive film (PET 25PA-Tl, manufactured by Rintech K.K.) composed of a polyethylene terephthalate resin was adhered on one surface of the polycarbonate-based resin plate B by a hand roll, and a releasing film laminated on the adhesive film was pealed, then, this adhesive film was adhered temporarily to one surface of the acrylic resin plate A, when, the product was placed in an autoclave (40° C., 7 atm.) for 0.5 hours to adhere the polycarbonate-based resin plate B (surface layer(5)) to one surface of the acrylic resin plate(first substrate(2)) via a polyethylene terephthalate resin layer(surface bonding layer(6)).

Then, the polycarbonate-based resin plate A (second substrate(3)) was bonded via the bisphenol type epoxy-based cured resin layer(first bonding layer(4)) to the other surface of the acrylic resin plate A (first substrate(2)) to obtain a transparent laminate.

The results of the evaluation of the obtained transparent laminate are shown in Table 1.

Comparative Example 3

A transparent laminate was obtained in the same manner as in Example 2 except that a polyethylene terephthalate resin plate (300 mm×300 mm, thickness: 0.25 mm, corresponding to a surface layer(5)) was used instead of the polycarbonate-based resin film B (thickness: 0.5 mm).

The results of the evaluation of the obtained transparent laminate are shown in Table 1.

Comparative Example 4

A laminate(first substrate composed of an acrylic resin/first bonding layer composed of an acrylic resin/second substrate composed of a polycarbonate-based resin) was obtained in the same manner as in Example 1 except that an acrylic resin plate(Sumipex® XT100, manufactured by Sumitomo Chemical Co., Ltd., thickness: 10 mm) was used as the first substrate(2) and the surface layer(5) composed of the polycarbonate-based resin was not provided on the first substrate.

The results of the evaluation of the obtained transparent laminate are shown in Table 1.

Example 6

A laminate which was composed of a surface layer(5) (thickness: 1.5 mm) composed of a polycarbonate-based resin/a surface bonding layer(6)(thickness: 100 μm) composed of an acrylic resin/ a first substrate(thickness: 10 mm) composed of an acrylic resin and had a size of 2000 mm×1000 mm was obtained in the same manner as in Example 1 except that a polycarbonate-based resin plate having a thickness of 1.5 mm was used.

Four pieces of this laminate were produced, and warping thereof was measured. A convex part around center was placed on a flat plate and distances between the four corners and the plane were measured. The result was from 15 to 27 mm.

When the second substrate(3) composed of the polycarbonate-based resin was bonded to the surface of the third substrate(8) composed of the polycarbonate-based resin in the same manner as in Example 1 using these laminates, the epoxy resin liquid often leaked out and the yield of the transparent laminate decreased.

Example 7

A laminate which was composed of a surface layer(5) (thickness: 1.5 mm) composed of a polycarbonate-based resin/a surface bonding layer(6) (thickness: 100 μm) composed of an acrylic resin/ a first substrate(2) (thickness: 10 mm) composed of an acrylic resin/ a second bonding layer (9) (thickness: 100 μm) composed of an acrylic resin/ a third substrate composed of a polycarbonate-based resin and had a size of 2000 mm×1000 mm was obtained in the same manner as in Example 4 except that a polycarbonate-based resin plate having a thickness of 1.5 mm was used.

Warping of this laminate was measured to find it was from 1 to 4.5 mm.

When the second substrate(3) composed of the polycarbonate-based resin was bonded to the surface of the third substrate(8) composed of the polycarbonate-based resinacrylic resin in the same manner as in Example 4 using these laminates, leaking of the epoxy resin liquid was scarcely observed.

TABLE 1

|  | Impact test result | | Transparency | Visibility of |
|---|---|---|---|---|
|  | First | Second | (before impact) | impact position |
| Example 1 | ○ | ○ | ○ | ○ |
| Example 2 | ○ | ○ | ○ | ○ |
| Example 3 | ○ | ○ | ○ | ○ |
| Comparative example 1 | ○ | x | ○ | x |
| Comparative example 2 | ○ | x | ○ | x |
| Comparative example 3 | ○ | x | ○ | x |
| Comparative example 4 | ○ | Δ | ○ | Δ |

As is apparent from Table 1, transparent laminates obtained in Examples 1, 2 and 3 of the present invention have excellent transparency, and at the same time, have sufficient impact resistance against strong impact, and further, are excellent in impact resistance when they receive impact twice. Further, impact position reveals no whitening at all (after impact twice), and excellent transparency is secured even after impact.

However, transparent laminates obtained in Comparative Example 1,2,3 and 4 have not sufficient impact resistance when they receive impact twice.

Such comparison test results evidence that unexpected and advantageous properties and results are associated with the instant inventive laminate.

What is claimed is:

1. A transparent laminate comprising:
    a laminate substrate obtained by bonding a second substrate composed of a polycarbonate resin to a first surface of a first substrate composed of an acrylic resin via a first bonding layer composed of a resin having a glass transition temperature (Tg) of 50° C. or less;
    and a surface layer composed of a polycarbonate resin bonded via a surface bonding layer composed of an acrylic resin to a second surface of said first substrate;
    wherein the thickness of said surface layer is from about 0.1 to about 3 mm;
    wherein the thickness of said first substrate is from about 3 to about 30 mm and the thickness of said second substrate is from about 3 to about 15 mm; and
    wherein the thickness of said first bonding layer is from about 0.1 to about 4 mm and the thickness of said surface bonding layer is from about 20 to about 200 μm.

2. The transparent laminate according to claim 1, wherein a third, substrate composed of a polycarbonate resin is laminated between the first substrate composed of an acrylic resin and the second substrate composed of a polycarbonate resin, and said first substrate is bonded to the third substrate via a second bonding layer composed of an acrylic resin and the third substrate is bonded to the second-substrate via the first bonding layer composed of a resin having a glass transition temperature (Tg) of 50° C. or less, respectively, wherein the thickness of said third substrate is from about 0.1 to about 3 mm and said second bonding layer is from about 10 to about 1000 μm.

3. The transparent laminate according to claim 2, wherein said surface bonding layer or said second bonding layer is composed of an acrylic resin having a vicat softening point from about 50 to about 90° C. and a haze, when the thickness thereof is 50 μm, of about 1 to about 60%.

4. The transparent laminate according to claim 2, wherein said first substrate comprises about 0.1 to about 72 parts by weight of a multi-layer elastomer particle per 100 parts by weight of the acrylic resin.

5. The transparent laminate according to claim 2, wherein said resin having a glass transition temperature (Tg) of 500° C. or less is a bisphenol epoxy cured resin.

6. The transparent laminate according to claim 1, wherein said first substrate comprises about 0.1 to about 72 parts by weight of a multi-layer elastomer particle per 100 parts by weight of-the acrylic resin.

7. The transparent laminate according to claim 1, wherein said resin having a glass transition temperature (Tg) of 50° C. or less is a bisphenol epoxy cured resin.

8. The transparent laminate according to claim 1, wherein said surface bonding layer is composed of an acrylic resin having a vicat softening point from about 50 to about 90° C. and a haze, when the thickness thereof is 50 μm, of about 1 to about 60%.

* * * * *